US010482464B1

(12) United States Patent
Dietrich et al.

(10) Patent No.: US 10,482,464 B1
(45) Date of Patent: Nov. 19, 2019

(54) IDENTIFICATION OF ANOMALOUS TRANSACTION ATTRIBUTES IN REAL-TIME WITH ADAPTIVE THRESHOLD TUNING

(71) Applicant: Wells Fargo Bank, N.A., Charlotte, NC (US)

(72) Inventors: David J. Dietrich, Charlotte, NC (US); Christopher P Smith, Marvin, NC (US); Stephanie D. Smith, Redwood, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 625 days.

(21) Appl. No.: 14/984,329

(22) Filed: Dec. 30, 2015

(51) Int. Cl.
*G06Q 20/40* (2012.01)
*G06Q 30/00* (2012.01)
*G06Q 40/00* (2012.01)

(52) U.S. Cl.
CPC ................. *G06Q 20/4016* (2013.01)

(58) Field of Classification Search
CPC .... G06Q 20/4016; G06Q 30/00; G06Q 40/00; G06Q 40/025; G06Q 40/08
See application file for complete search history.

(56) References Cited

U.S. PATENT DOCUMENTS

| 2010/0287099 | A1* | 11/2010 | Liu ................. | G06Q 20/40 705/44 |
| 2015/0170148 | A1* | 6/2015 | Priebatsch ......... | G06Q 20/4016 705/44 |
| 2016/0063501 | A1* | 3/2016 | Kalyan .............. | G06Q 20/4016 705/42 |
| 2016/0210633 | A1* | 7/2016 | Epelman ............ | G06Q 20/4016 |
| 2017/0148025 | A1* | 5/2017 | Le ..................... | G06Q 20/4016 |

OTHER PUBLICATIONS

Dynamically Tuning Processor Resources with Adaptive Processing by Albonesi et al., IEEE, 2003.*
Muhammad Qasim Ali and Ehab Al-Shaer, Automated Anomaly Detector Adaptation Using Adaptive Threshold Tuning, ACM Transactions on Information and System Security, vol. 15, No. 4, Article 17, Apr. 2013.*

* cited by examiner

*Primary Examiner* — Hao Fu
(74) *Attorney, Agent, or Firm* — Walter Haverfeld LLP; James J. Pingor

(57) ABSTRACT

Identification of anomalous transaction attributes in real-time with adaptive threshold tuning is provided. A set of historical transactions conducted during a defined time period are analyzed and categorizing into defined groups. Outlier transactions are identified and removed from the set of historical transactions and a set of non-anomalous transactions are determined. When a new transaction is received, the new transaction is automatically allowed based on a determination that the subsequent transaction conforms to the set of non-anomalous transactions. Alternatively, an alert for further analysis for the new transaction is output based on a determination that the subsequent transaction does not conform to the set of non-anomalous transactions.

20 Claims, 10 Drawing Sheets

IDENTIFICATION OF ANOMALOUS TRANSACTION ATTRIBUTES IN REAL-TIME WITH ADAPTIVE THRESHOLD TUNING

BACKGROUND

As it relates to financial crimes, fraud techniques have evolved to a point where it has become more difficult to determine that fraud is occurring based on browser information or from a technology standpoint. Fraudsters have been spending effort on perpetrating imposter fraud, which relates to convincing a customer to transfer money (e.g., send a wire) to the fraudster. Thus, since it is the customer transferring the money, the fraud might not be detected based on analysis of technological resources.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to fraud detection based on anomalous transaction attributes. An aspect relates to a processor that executes computer executable components stored in a memory. The computer executable components may include a simulation manager that systematically models one or more attributes of transactions included in a set of historical transactions. The computer executable components may also include a limitation manager that determines a ceiling threshold for one or more transaction level characteristics associated with the set of historical transactions. The transaction level characteristics represent respective values beyond which a subsequent transaction is considered anomalous for that characteristic. Further, the computer executable components may include a detection manager that provides real-time, or substantially real-time, detection of anomalous transactions and non-anomalous transactions. Respective alerts are output based on detection of the anomalous transactions.

Another aspect relates to a method that includes evaluating, by a system comprising a processor, a set of transactions conducted during a defined time period and categorizing, by the system, transactions within the set of transactions into defined groups. The method may also include removing, by the system, outlier transactions from the set of transactions, identifying, by the system, a set of non-anomalous transactions, and receiving, by the system, a subsequent transaction. Further, the method may include automatically allowing the subsequent transaction based on a determination that the subsequent transaction conforms to the set of non-anomalous transactions or outputting an alert for further analysis of the subsequent transaction based on a determination that the subsequent transaction does not conform to the set of non-anomalous transactions.

Yet another aspect relates to a computer-readable storage device that stores executable instructions that, in response to execution, cause a system comprising a processor to perform operations. The operations may include systematically modeling one or more attributes of transactions included in a set of historical transactions. The operations may also include determining a ceiling threshold for one or more transaction level characteristics associated with the set of historical transactions. The transaction level characteristics represent respective values beyond which a subsequent transaction is considered anomalous for that characteristic. Further, the operations may include providing real-time, or substantially real-time, detection of anomalous transactions and non-anomalous transactions. Respective alerts may be output based on detection of the anomalous transactions.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Figure 1:
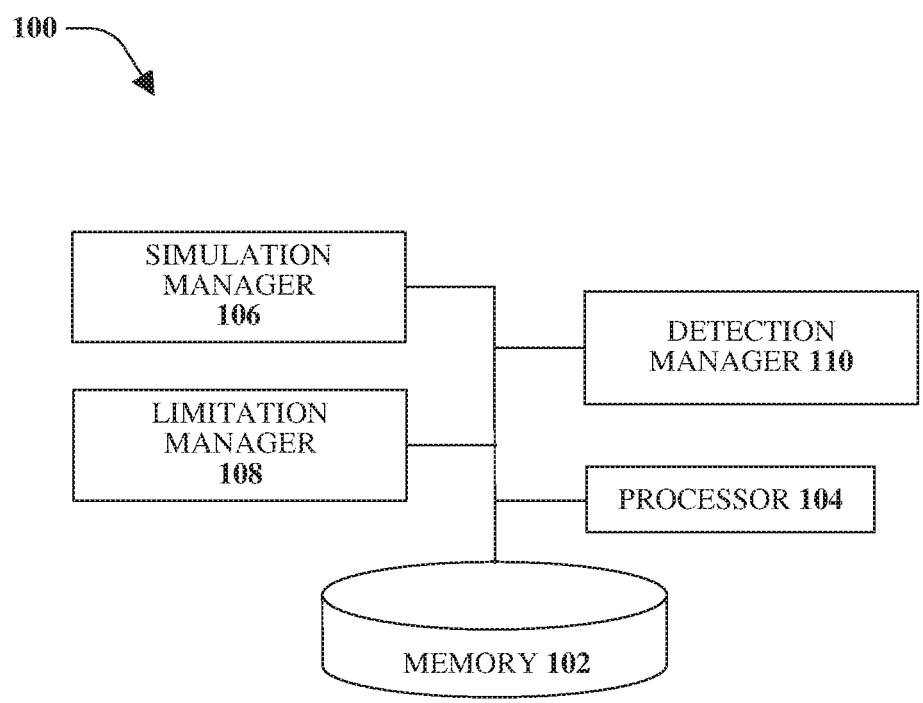
FIG. 1 illustrates an example, non-limiting system configured to identify anomalous transaction attributes, according to an aspect.

FIG. 1 illustrates an example, non-limiting system 100 configured to identify anomalous transaction attributes, according to an aspect. In some electronic commerce environments, fraudulent interactions (e.g., payments, wire transfers, and so on), may be common. For example, fraudsters have developed the means to limit the ability of a controlling entity (such as a financial institution or a trusted third-party) to detect a single fraudulent transaction directly. This problem may develop in various situations such as impostor fraud, including a "man-in-the-email" scheme, which is an e-mail variation of a "man in the middle" scam. By the use of impostor fraud, it is the actual customer (or an identity of the customer) of the financial institution that is performing the interaction. The identity of the customer may relate to the actual customer (e.g., a person operating a communication device) and/or information related to the communication device (e.g., machine access code, telephone number, internet protocol address, temporary mobile subscriber identity (TMSI), international mobile subscriber identity (IMSI), and so on). To mitigate these fraudulent interactions, the disclosed aspects provide for the identification of anomalous transaction attributes in real-time with adaptive threshold tuning. The adaptive threshold tuning may be behaviorally based, according to some implementations.

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be a simulation manager 106 that may be configured to systematically model one or more attributes of each transaction of a set of transactions, which may be associated with a single customer. The attributes may be measureable attributes (e.g., a velocity (such as the frequency with which a particular customer makes transactions), an amount, a destination, and so on). The simulation manager 106 may systematically model the one or more attributes continuously, periodically, randomly, or at other times.

Each attribute of the one or more attributes may independently carry some measure of the customer's standard practices or patterns. As used herein an "interaction" may be any touch point or transaction between the financial institution and the user. According to an implementation, the interaction may be an interaction that the user is having with an electronic website associated with a financial entity.

According to an implementation, an attribute may be a behavioral attribute, which may include the number and types of wire transfers that a customer sends over time. An attribute may be based on security controls employed by the customer. For example, a determination may be made based on whether or not the customer has a dedicated account for certain payment activities. In another example, a determination may be made whether the customer predominately or exclusively sends domestic wires, international wires, or a combination thereof. In a further example, it may be determined whether the customer transacts business in high-risk countries. Another determination may be whether the customer has a large amount of variance in the size of their typical transaction. Further, a determination may be whether the customer creates a large number of wires to new beneficiaries that have not been seen before by the financial institution. Other determinations may also be made and these examples are provided merely for purposes of explaining the disclosed aspects.

According to some implementations, one or more attributes may be based on how a customer constructs their wires. In other words, this may include details about what may be observed with respect to the customer's infrastructure. One example is the size of the customer (e.g., is the customer an individual or a business, and how large is the business). Another example is the version of browser the customer is using and/or when was the last time the customer updated the browser. A further example relates to the customer's internal technology and how current or "up to date" has the technology been maintained.

Attributes may also relate to literal controls. For example, customers may have dual custody (or custody levels that are greater than dual custody, such as triple custody). Thus, these customers have more than one person reviewing the wires. In another example, how the customer builds its wires may be utilized as an attribute. For example, does the customer always use a template, which may provide additional control layers? Further, some of the attributes may not be related to payments specifically, but may relate to how the customer interacts with the portal and what may be derived from the tools and/or devices the customer is using for the interaction.

Based on the modeling performed by the simulation manager 106, a limitation manager 108 may determine a ceiling threshold for one or more interaction or transaction level characteristics. The threshold may represent a value for the transaction level characteristic, beyond which any subsequent transaction would be considered anomalous for that characteristic within the scope of a customer's relationship, as would be the case with corporate clients.

A detection manager 110 may be configured to provide real-time detection of anomalous transactions. The detection manager 110 may also be configured to systematically maximizing the number of fraudulent transactions that would have been detected using the disclosed aspects, while minimizing the false positive alert rate among all transactions at substantially the same time.

Figure 2:
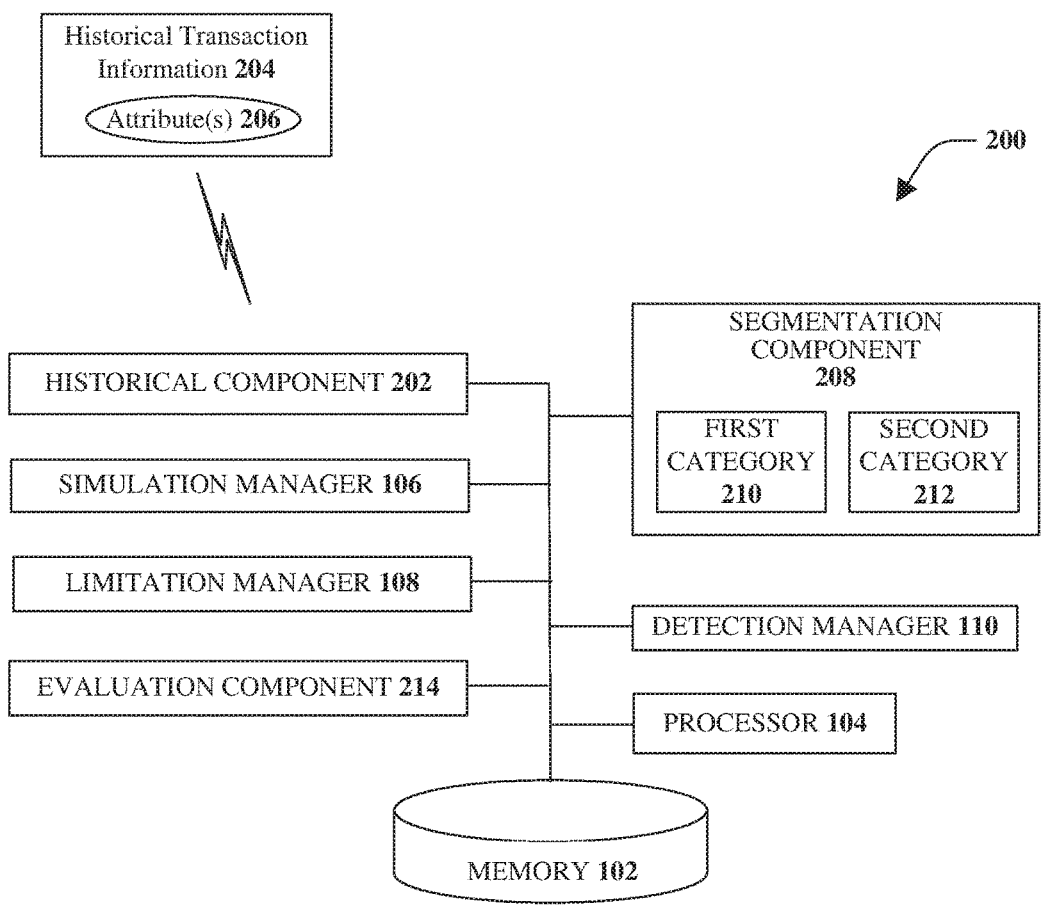
FIG. 2 illustrates an example, non-limiting system configured to identify transaction attributes, according to an aspect.

FIG. 2 illustrates an example, non-limiting system 200 configured to identify transaction attributes, according to an aspect. Fraudsters have become more sophisticated at disguising from a technology standpoint that they have infiltrated the customer. Thus, it is more difficult to track from the perspective of a browser or a technology standpoint that fraud is occurring.

What fraudsters are doing is spending a lot of their effort in imposter fraud. Thus, instead of trying to take over a communications device of a customer, log in, and initiate a transaction, it is more of a confidence approach where they are trying to convince the customer to send a transaction that they should not send. It may be an email, a phone call, or multiple contacts over a few days to set up the impression that this is a legitimate request and to pay an outstanding bill. In this case, the financial institution has no ability to detect something based on the customer's communications device. This is because it actually is a customer initiating a transaction from their account to someone they should not be sending money to.

Thus, the disclosed aspects evaluate historical interactions (e.g., transactions) of the customer to determine what is typical for the customer. Based on this determination, real-time transactions are evaluated to determine if the new transactions conform to what is expected for the customer.

Included in the system 200 may be a historical component 202 that may be configured to capture historical transaction information 204 for one or more customers. The historical transaction information 204 may include a population of the transactions performed by each customer. The historical transaction information 204 may be captured on a rolling basis, according to some implementations. Thus, the disclosed aspects do not set a high limit as the largest transaction the customer has initiated. For example, the historical transaction information 204 may be captured on a rolling twelve-month basis. Thus, historical transaction information for a most recent month may be added, while other historical transaction information from twelve months ago are removed. In some implementations, other time frames may be utilized (e.g., three months, six months, twenty-four months, and so on) and/or a number of transactions may be utilized on a rolling basis (e.g., most recent fifty transactions, most recent one hundred transactions, and so forth).

Each historical transaction information of the population of historical transaction information 204 may include attributes 206. For example, each transaction may include more one or more attributes 206. Further, there may be overlap (e.g., the same, substantially the same, common) attributes for two or more transactions associated with each customer (or for different customers). For example, a customer may send a first wire transfer in the amount of $100,000 and a second wire transfer in the amount of $100,000 on the same day (or on different days within the time period being analyzed). Therefore, both the first wire transfer and the second wire transfer have a common attribute, namely the dollar amount of the transfer or $100,000.

A segmentation component 208 may be configured to perform a pre-segmentation of the historical transaction information 204. For example, the segmentation component 208 may be configured to identify and separate the historical transaction information 204 into at least a first category 210 and a second category 212. The first category 210 and the second category 212 are mutually exclusive (e.g., transactions are only classified into one of the categories).

According to an implementation, the first category 210 may include domestic transactions and the second category 212 may include international transactions. Thus, the segmentation component 208 may make the separation determination based on a location of a recipient of the transfer (or payment). The transactions may be split based on the destination because a customer might send large financial transactions domestically and might send small transactions internationally. Thus, if the domestic transactions are utilized to set the threshold for the international transactions, the threshold will be set too high. This may leave the customer vulnerable and provide a variance that the fraudster may exploit.

The identification and separation of the transactions between domestic transactions and international transactions may be useful since these two distinct populations of transactions may have highly heterogeneous sets of attributes and should remain separate for the purposes of statistical evaluation. According to some implementations, other transaction types exists that may also be separated for purposes of statistical evaluation. Therefore, these other transaction types may be applied within the context of the disclosed aspects without altering the effectiveness of the various aspects.

The simulation manager 106 may be configured to model the different attributes 206 of the historical transaction information 204. The modeling may be utilized to identify one or more attributes associated with each transaction. For example, a first transaction may be associated with a first dollar amount and a first destination. Further, a second transaction may be associated with second dollar amount and a second destination. A third transaction may be associated with a third dollar amount and the first destination. Accordingly, the simulation manager 106 may determine that the destination attribute of the first transaction and the third transaction are the same and aspects of those transactions should be evaluated together. In a specific example, the first destination may be an international destination and the second destination may be a domestic destination.

An evaluation component 214 may be configured to perform one or more statistical evaluations on the population of historical transaction information in the first category 210 separate (independent) from one or more statistical evaluations performed on the population of historical transaction information in the second category 212. As a result of the one or more statistical evaluations, the limitation manager 108 may be configured to determine outliers based on previously measured distributions of the customer's transactions (e.g., the first category 210 and the second category 212). The limitation manager 108 may ignore the determined outliers in order to identify a highest transaction attribute value that represents a raw attribute ceiling threshold. If a new transaction is received that is above the raw attribute ceiling threshold, an alert may be submitted in order for a fraud investigation to be performed.

It is noted that a statistical test may be susceptible to large errors when using small sample sizes. Therefore, basic business rules and population metrics may be used to identify thresholds when few historical transactions are available for analysis.

Figure 3:
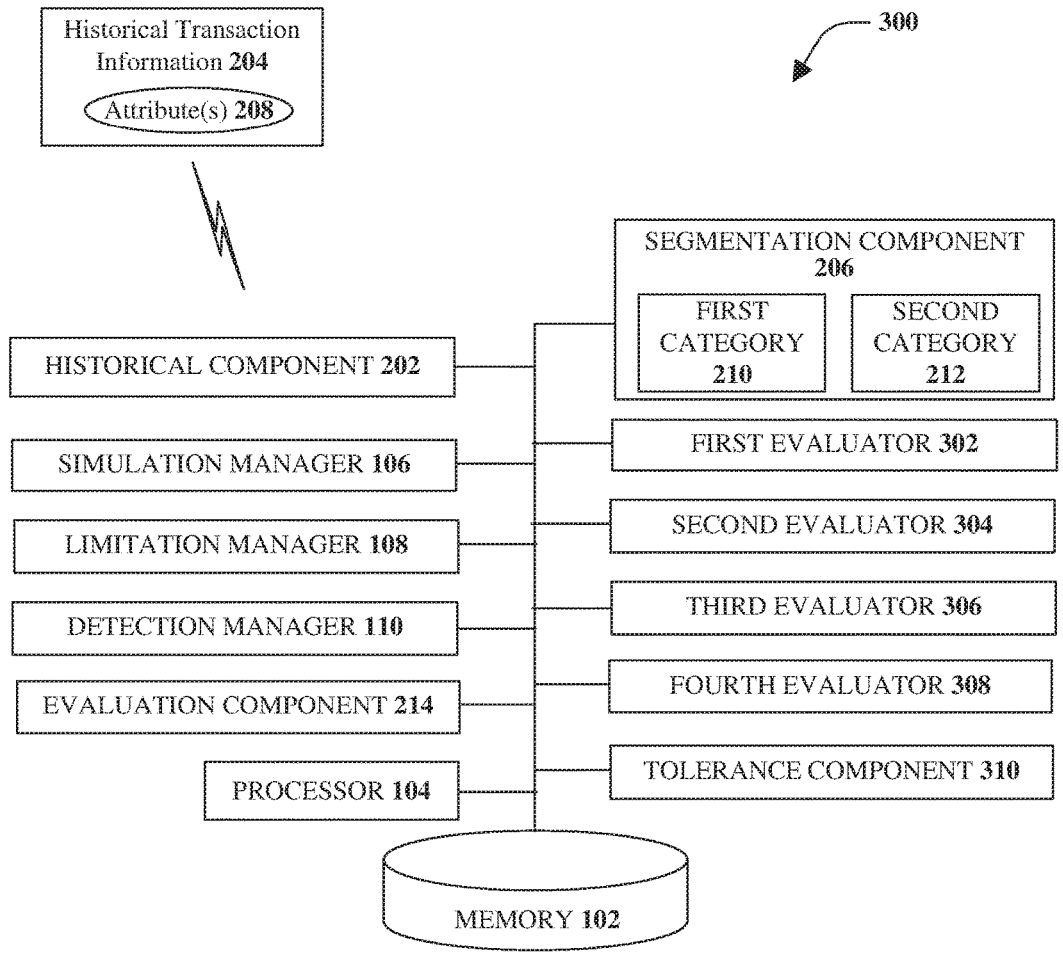
FIG. 3 illustrates an example, non-limiting system configured to perform statistical evaluations on historical transaction information, according to an aspect.

FIG. 3 illustrates an example, non-limiting system 300 configured to perform statistical evaluations on historical transaction information, according to an aspect. Various historical transactions and anomalous transaction attributes (as well as non-anomalous transaction attributes) of those transactions are compared to new transactions (in real-time or near real-time) to determine if the new transactions are in conformance with what is expected. In some implementations, the anomalous transaction attributes relate to the amount and destination of each transaction. Each new transaction may be examined to determine if it is reasonable for the customer to perform the transaction. Thus, it may be tailored for the customer, rather than just relying on a transaction amount cut-off.

As discussed, transactions over a determined time interval may be evaluated (e.g., a rolling basis). Thus, older transactions may drop out of the evaluation as newer transactions are collected. In this manner, the disclosed aspects do not look at the largest transaction performed by the customer. Instead, a distribution of transactions is reviewed. At times, there may be a handful of large transactions and the main group of transactions may be much smaller. The main group is used as acceptable transactions and an alert is output when the larger transactions are detected. The tradeoff here is that there may be a penalty (from the customer's perspective) when there is an alert on a legitimate large transactions, but it is beneficial to reduce the exposure to fraud on the large transactions.

According to various implementations, the largest transactions and/or various outliers may be removed from the data set being analyzed. Thus, the system 300 may be configured to use a determined smallest large wire that the customer has sent (within the timeframe being evaluated) and mark that transaction as what is typical for the customer.

Multiple approaches may be utilized to evaluate the data and remove outliers since the data being analyzed may be a small set of data. Some customers they do not perform many transactions during the evaluation period; other customers do perform many transactions over the save evaluation period. Therefore, a few different ways of looking at the data and pulling out the transactions that stand out are utilize. In an example, there may be four or more approaches used for each customer. These approaches (e.g., evaluations) may be designed to throw out the high-end transactions. Further, these approaches operate in different manners and identify different sets of data.

A first evaluator 302 may be configured to perform a Cook's distance (or Cook's D) measurement. The Cook's D measurement is an estimate of an influence of a data point when a least square regression analysis is performed. The first statistical evaluator 302 may utilize the Cook's D measurement to determine outliers of variance using a standardized residual distance of a particular characteristic from the historically observed trend for that attribute. The outliers of variance may be utilized to provide a metric for how divergent a transaction parameter is from an expected value for the populations' trend. The outliers of variance may also be utilized to determine how much a characteristic would influence a historical trend if that outlier were included.

For example, Cook's D may identify how much a regression line moves if the highest transaction amount is included, or is removed from the analysis. Thus, if the highest amount transaction is removed and a Cook's D measurement is executed, would another transaction be outside the cutoff amount (e.g., ignoring that the highest amount transaction occurred). The top ten or fifteen transaction amounts may be analyzed and the system may iteratively take away the highest transaction and determine where there is a big leap.

In a specific example, a customer may have two transaction amounts that are close together, such as $1,000,000 and $1,000,005. This is not a big leap because there is only a $5.00 difference between the two transactions. However, the next highest wire may be $100,000, which is a big leap and identifies a gap. In this case, the first two transactions ($1,000,000 and $1,000,005) will be removed from the analysis because, even though those transactions are close to each other, they are vastly different from the next highest transaction of $100,000 (and accordingly the other transactions).

Outliers of absolute magnitude that conform to an expected variance distribution may fail to be identified by the first evaluator 302. Therefore, a second evaluator 304 may be configured to classify these outliers. To classify the outliers, the second evaluator 304 may utilize a non-parametric Kruskal-Wallis one-way analysis of variance.

Kruskal-Wallis is evaluating the median (the middle number) in the list of transactions. Thus, the system is evaluating all the transactions, not just the top ten or fifteen, to determine if there is a leap in the middle. It is not focusing on the end, but is instead determining whether if one is taken off the end, does the middle make a huge shift. This evaluates whether there is a solid, defined middle, or if there is a gap in the middle of the transactions that were sent. If it is not a stable middle (e.g., not a solid group) and there is a big leap or gap found in the middle, additional transactions at the top end may need to be removed.

Thus, the second evaluator 304 may calculate a probability distribution enabling the placement of any newly observed transaction characteristics within that distribution. Further, the second evaluator 304 may determine the likelihood of that newly observed transaction attribute within the context of absolute magnitude.

The following equation is a mathematical description of Cook's D:

$$D_i = \frac{\sum_{j=1}^{n} (\hat{Y}_j - \hat{Y}_{j(i)})^2}{pMSE}, \qquad \text{Equation 1.}$$

where:
$\hat{Y}_j$ is the prediction from the full regression model for observation j;
$\hat{Y}_{j(i)}$ is the prediction for observation j from a refitted regression model in which observation/I has been omitted;
p is the number of fitted parameters in the model; and
MSE is the mean square error of the regression model.

The following equations are the algebraically equivalent expressions (in the case of simple linear regression):

$$D_i = \frac{e_i^2}{pMSE}\left[\frac{h_{ii}}{(1-h_{ii})^2}\right], \qquad \text{Equation 2.}$$

$$D_i = \frac{(\hat{\beta}-\hat{\beta}^{(-i)})^T (X^TX)(\hat{\beta}-\hat{\beta}^{(-i)})}{(1+p)s^2}, \qquad \text{Equation 3.}$$

where:
$h_{ii}$ is the leverage (e.g., the i-th diagonal element of the hat matrix $X(X^TX)^{-1}X^T$;
$e_i$ is the residual (e.g., the difference between the observed value and the value fitted by the proposed model).

By way of example, the following is a mathematical description of Kruskal-Wallis One Way analysis of variance (ANOVA). First, all data from all groups are ranked together. For example, the data from 1 to N are ranked, ignoring group membership. Any tied values are assigned to the average of the ranks the tied values would have received had they not been tied.

The test statistic is given by:

$$K = (N-1) \frac{\sum_{i=1}^{g} n_i (\bar{r}_{i\cdot} - \bar{r})^2}{\sum_{i=1}^{g} \sum_{j=1}^{n_i} (r_{ij} - \bar{r})^2},$$

Equation 4.

where:

$n_i$ is the number of observations in group i;
$r_{ij}$ is the rank (among all observations) of observation j from group i;
N is the total number of observations across all groups;

$$\bar{r}_{i\cdot} = \frac{\sum_{j=1}^{n_i} r_{ij}}{n_i},$$

and $$\bar{r} = \frac{1}{2}(N+1)$$

is the average of all the $r_{ij}$.

If the data contains no ties, the denominator of the expression for K is exactly $(N-1)N(N+1)/12$ and $$\bar{r} = \frac{N+1}{2}.$$

Thus, $$K = \frac{12}{N(N+1)} \sum_{i=1}^{g} n_i \left(\bar{r}_{i\cdot} - \frac{N+1}{2}\right)^2$$

Equation 5.

$$= \frac{12}{N(N+1)} \sum_{i=1}^{g} n_i \bar{r}_{i\cdot}^2 - 3(N+1).$$

The last formula only contains the square of the average ranks.

Returning to FIG. 3, the system 300 may also include a third evaluator 306 that may be configured to determine a number of standard deviations from a mean (e.g., a six-sigma level). Assuming a normal distribution, there will be about the same number of high wires above the low wires, with a bell curve approach. If a wire is too far outside the bell curve, the third evaluator 306 will throw that wire (e.g., outlier) away or ignore attributes associated with that wire. It is noted that the cutoff for all of these thresholds are configurable (e.g., may be changed to be higher or lower).

A fourth evaluator 308 may be configured to determine a business rule in terms of absolute dollar amount leaps (or gaps) across one wire to the next, or across multiple wires (e.g., between the remaining transactions). On the high end, it might not be unusual because a customer may send very large wires. However, from a business perspective, a leap of a million dollars (or another dollar amount) might be concerning, even though the transaction conforms to the pattern (e.g., it is beyond a risk comfort level established by the business).

For example, a first transaction has a value of $1,000,000 and a second transaction has a value of $900,000. The difference between the first transaction and the second transaction, in this example, is $100,000. Therefore, there is a $100,000 gap. In some cases, the first evaluator 302, the second evaluator 304, and the third evaluator 306 might not find this case due to there not being enough data and, thus, the gap is not detected. From a business risk standpoint, there may be gaps that are unacceptable. Therefore, a configurable number may be established to determine how much of a leap is too much, which may be spanned between two wires or across multiple wires.

The output of each of the evaluators provides a raw number, which has configurable limits on the high end and the low end. Thus, if a business (e.g., a customer, the financial institution, and so on) has a ceiling above which it is desired that the system alerts on the transaction, even if it looks typical for the customer, an alert will be output. It is a business policy and is a number that may be raised and lowered. The same may be implemented for a low limit. If a customer has never sent a first beneficiary wire or it is a new customer, there is not enough information and no limits have been established for the customer. Therefore, there is a lower limit that is configurable and is applied to all customers initially. The first time the customer sends a wire, it is a low limit. Once there are historical transactions from this customer, there will be limits established between a high level and a low level. Accordingly, the evaluators establish the middle level, which is a customer level for a customer based on an established history between the customer and the financial institution.

Since the first evaluator 302, the second evaluator 304, the third evaluator 306, and the fourth evaluator 308 have identified the outliers (e.g., the ones on which the system should alert), the highest transaction attribute value not identified as an outlier is indicated by the limitation manager 108 to be the raw attribute ceiling threshold.

A tolerance component 310 may be configured to refine the threshold to identify a new threshold that represents a material increase over the raw threshold. The new threshold may help mitigate additional scrutiny for transactions that exceed the threshold in marginal terms. The tolerance component 310 may further scale the new threshold as a function of a tolerance for risk of a loss.

To determine the new threshold, the tolerance component 310 may take a minimum of two new alternate thresholds. A first alternate threshold may be calculated by the tolerance component 310 by taking a range of the transaction values (smallest and largest) and dividing the difference between those two values by a configurable number that produces a minimally material increase by percentage over the raw threshold. If this percentage produces a value that exceeds the absolute maximum exposure that is willing to be risked for that attribute, the new threshold is the raw threshold plus that value.

Additionally, the threshold refinement process may provide minimum threshold values for customers that have insufficient transaction activity to provide statistically valid input into the evaluators as discussed above. For example, these customers may be new customers, or they may be customers that rarely transact wires. These customers may have applied a universally derived percentage over their maximum observed or more recent transaction attribute value.

By way of example, the following provides a mathematical description of a quantile method as discussed herein. For a population of discrete values, or for a continuous population density, the k-th q-quantile is the data value where the cumulative distribution function cross k/q. That is, x is a k-th q-quantile for variable X if:

$Pr[X<x] \leq k/q$ (or equivalently, $Pr[X \geq x] \geq 1-k/q$)

and $Pr[X \leq x] \geq k/q$ (or equivalently, $Pr[X>x] \leq 1-k/q$).

For a finite population of N values indexed 1, ..., N from lowest to highest, the kth q-quantile of this population may be computed via the value of $$I_p = N\frac{k}{q}.$$

If $I_p$ is not an integer, then round up to the next integer to obtain the appropriate index; the corresponding data value is the kth q-quantile. On the other hand, if $I_p$ is an integer, then any number from the data value at that index to the data value of the next may be taken as the quantile, and the average of those two values may be taken.

Figure 4:
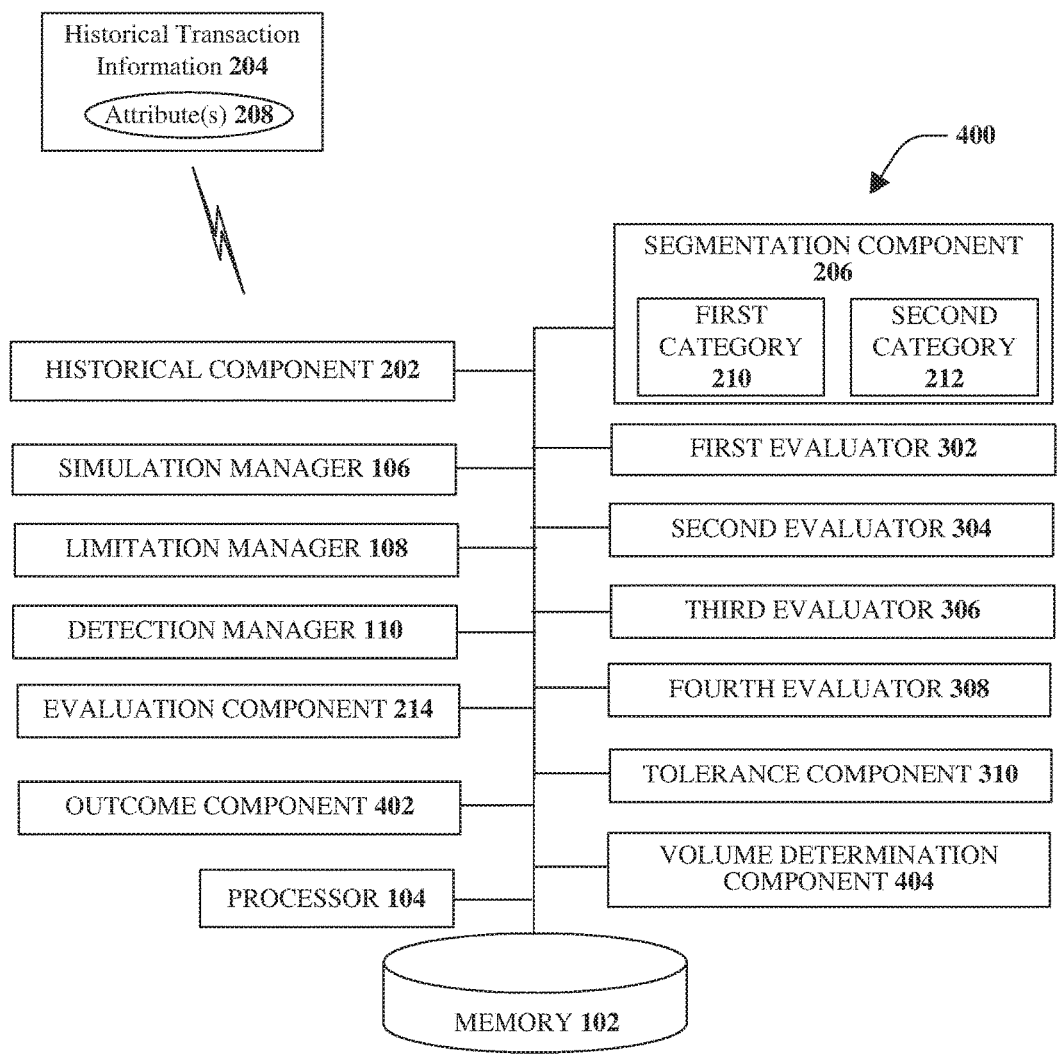
FIG. 4 illustrates an example, non-limiting system for adaptive learning and self-tuning, according to an aspect.

FIG. 4 illustrates an example, non-limiting system 400 for adaptive learning and self-tuning, according to an aspect. The system 400 may be configured to provide a feedback loop that allows for adaptive learning and self-tuning based on maximizing coverage of prior frauds while minimizing throughput yield.

An outcome component 402 may be configured to create a sample of the previously observed true positives (whether they were cases that needed to be investigated and/or cases that were determined to be true frauds). The outcome component 402 may also be configured to create a sample of all other transactions for the total customer population (e.g., for all customers).

A volume determination component 404 may be configured to determine a total aggregate volume that would be created using a baseline risk threshold criteria. This determination may be made by the volume determination component 404. For example, the volume determination component 404 may use just the universally determined minimum threshold as it would be applied to all customers regardless of their refined threshold. A comparison component 406 may be configured to compare the alert volume to the volume that would be created using the previously determined refined thresholds. This comparison may be utilized to determine what proportion would have been identified using the assigned thresholds for each customer.

If the ratio of true positives (detection rate for cases, and prevention rate for frauds) exceeds configurable thresholds for lift and incremental volume as compared to the universally derived baseline parameter, then the model does not need tuning. If not, the above is repeated by applying more or less tolerance for the raw outlier detection thresholds until the detection rate and/or total volume falls within acceptable limits. It is noted that acceptable risk thresholds are not limited to absolute losses. Instead, acceptable risk thresholds may include cost limits that incorporate volumes, and the need to staff for triage and investigation (risk-reward trade-offs are considered).

According to some implementations, simulations are performed related to what would happen if the thresholds created are used. Questions may be answered rated to what fraud would have gone undetected, what fraud would have alerted, what non-fraud would have alerted, and so on. A challenge is that every transaction might not be analyzed due to various constraints (e.g., resources, labor, time, and so on). Accordingly, the transactions and alerts may be refined or tuned. For example, transactions may be removed (e.g., ignored) based on the existing thresholds. The remaining transactions may be grouped, such as in categories based on the dollar amount threshold. Customers with a small threshold (e.g., $30,000 versus $1,000,000) are divided into equal groups (e.g., a stratifying segment). Those segments may be tuned individually compared to the threshold that was established. For example, if a customer has a threshold of $100,000, that may be tuned, such that if $100,000 is used, it is determined that there will be a certain number of alerts generated. Further, based on historical real-life outcomes, it may be determined how many of the alerts are true (e.g., fraudulent transactions) and how many are going to be false (e.g., legitimate transaction). Thus may be performed at 101% of the highest transaction amount, 102%, 103%, and so on up to twenty-times (or more) of the highest transaction amount. Then for each of those segments a determination is made as to where the best return on investment is located. According to an implementation, the primary metric used is fraud dollars detected per alert. The primary metric may be balanced by also considering the secondary metric percent of total fraud dollars detected.

For example, there are ten alerts generated for a customer. If any one of the alerts was proven to be fraudulent in the past, the dollar amount of that fraud is divided by the ten alerts. This skews the optimization to the larger dollars. If twenty frauds are stopped and each one is worth $1,000, it is not as beneficial as stopping a single transaction that is worth $25,000. Thus, the determinations may be skewed to the larger dollar transactions.

By using that metric, each segment may be tuned to provide the right amount of cushion on the high end (e.g., high transaction dollar amount). In the middle, where a large portion of transactions may occur, there may be less fraud experienced in the last year, so a little more cushion may be applied to those transactions. If in the past, fraud did not occur at the lower amount the system may not be as sensitive to the low dollar amount transactions. This is an ongoing process because things may change as fraudulent transactions at the higher dollar amount are alerted and blocked.

This may enable a set of thresholds for customers that simulations have indicated should be alerted in order to prevent a large percentage of past frauds. This may also generate a small number of alerts so that these transactions may be monitored by the team that performs that investigation.

The feedback loop may be looking across all customers. Using the individual custom thresholds, but applying them across all customers, all wires and frauds over the last year (or other defined period). Most customers do not have a fraud so might not tune for these customers. Thus if three transactions alert for these customers, the transactions are all going to be valid. This may only be evaluated in the aggregate by using the individual custom thresholds. Feedback is the tuning of the raw threshold. In the example, there is a $100,000 limit for what a first customer has done recently. The tuning may indicate that there is not much fraud occurring at this limit, so if the first customer's threshold is move to $200,000 and there is not an increase in fraud, the fraud must be higher than that. However, if the dollar amount is near the ceiling, then a dollar over my threshold is legitimate. The one or two that will alert will be so far above that higher number that there is not much negative (in terms of false positive) by using a tight cushion.

At lower limit, if it is a $26,000 limit, if it is a dollar over that it is not as big a deal, there is more cushion at that low level.

The feedback part is modifying the number that came out of the four (or more) evaluations. Based on real experience of fraud, even though this one was knocked off, this part is deciding how much cushion above that should be allowed (e.g., $1 or $10,000). The volume of alerts that will be output may be predicted based on the fraud discovered based on historical information.

With respect to the rolling-analysis period, the trend may be determined and any volatility may be managed. Some customers perform a lot of transactions and, as some data is removed and other data is added, thresholds may move a non-significant amount (e.g., less than $5,000). However, for new customers and/or customers that perform few transactions, there may be more volatility in terms of threshold levels. Thus, if their threshold is based on a relatively low number of transactions, and then a big transaction is sent, the threshold value may rise. However, the threshold should not be impacted (or react quickly) to one transaction since the transaction may be an anomaly itself. Thus, the threshold should not be changed until a pattern has been determined, which will then be the new high threshold (or the new low threshold).

In some cases, there may be a change due to the rolling nature of how the transactions are analyzed. Therefore, although the threshold value might not be raised based on the new analysis period, if a large transaction drops off the back end, the threshold value may be lowered. This is because the customer has not performed a large transaction during the remainder of the analysis period (e.g., during the last year), so the threshold value should be lower than where it was initially set.

Further, the changes are monitored and compared to a previous threshold value. The tuning process as well as the existing frauds for the evaluation period are evaluated and a determination is made whether there is a consistent trend. If the customer's transactions begin to diverge (e.g., the newer thresholds do not perform in the simulation as well as the previous thresholds), the tuning feedback process may be utilized to make a further adjustment to the threshold. In some implementations, the raw threshold may be changed and/or the expanded threshold (e.g., allow transactions that are 5% above the raw threshold) may be changed. This is also a quality assurance analysis since it may be determined what is changing in the list of thresholds.

Figure 5:
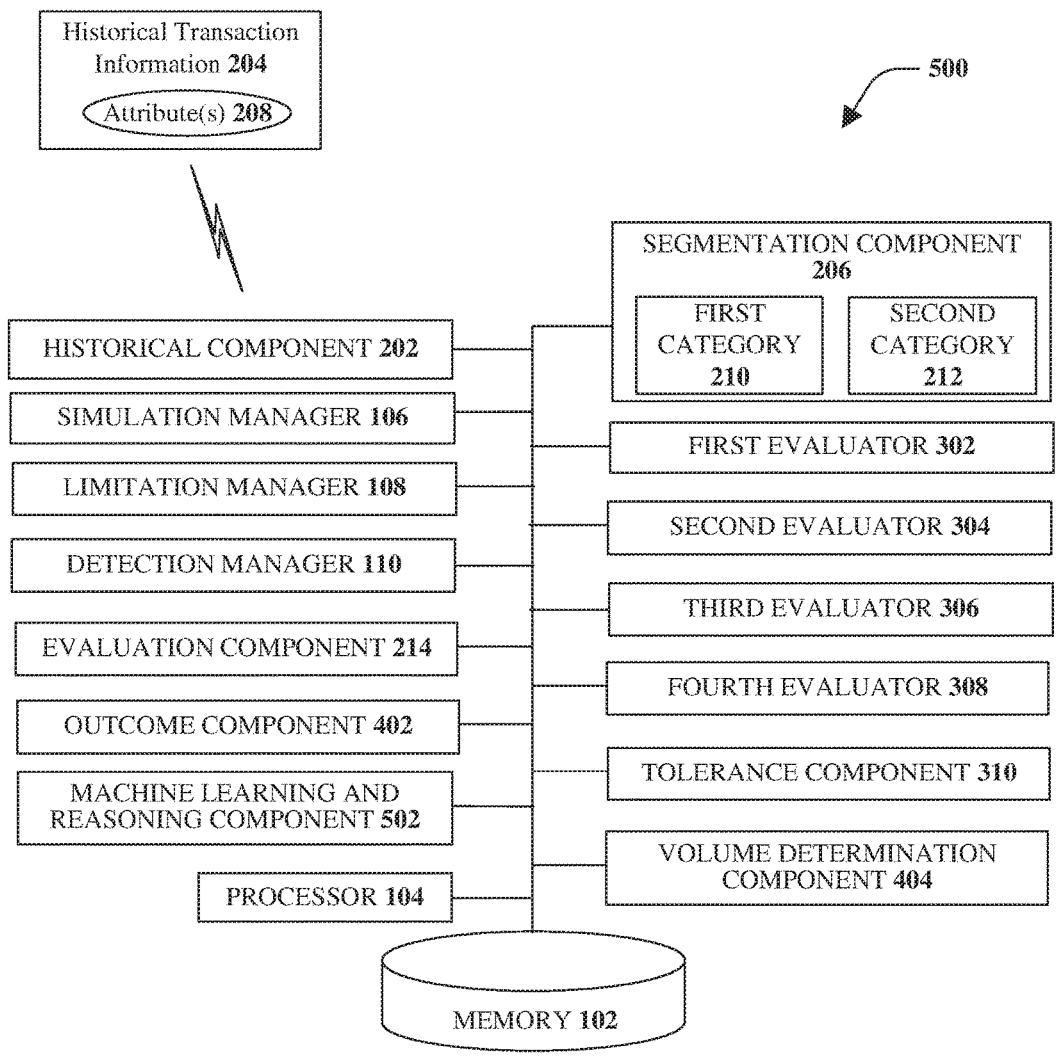
FIG. 5 illustrates an example, non-limiting system that employs automated learning to facilitate one or more of the disclosed aspect.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component may infer a pattern of transactions performed by a customer and associated risk levels by obtaining knowledge about the customer, including historical information and current information. Based on this knowledge, the machine learning and reasoning component 502 may make an inference based on which transactions are typical for the customer for different types of transactions (e.g., domestic versus international transactions), which historical transactions were non-fraudulent exceptions to the pattern and should be not be used to determine the typical transactions, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with identification of anomalous transaction attributes in real-time with adaptive threshold tuning) may employ various artificial intelligence-based schemes for carrying out various aspects thereof. For example, a process for determining if a particular transaction is within a range of "normal" transactions for that customer based on historical information, whether a customer's current transaction attempt conforms to the "normal" transaction pattern, and implementing one or more actions based on observance of ongoing transactions for the customer may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what transactions should be held for further scrutiny, which transactions should be automatically alerted on, which transactions should be automatically allowed, and so on. In the case of anomalous transaction attributes, for example, attributes may be identification of a pattern associated with transactions and the classes are one or more attributes associated with each transaction.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing customer behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria transactions that are common for a customer based on historical information, which historical transactions are anomalies and should be ignored for purposes of determining a pattern for the customer, and so forth. The criteria may include, but is not limited to, similar transactions, historical information, current information, transaction attributes, and so forth.

Additionally or alternatively, an implementation scheme (e.g., a rule, a policy, and so on) may be applied to control and/or regulate which transactions are considered to be routine and most likely non-fraudulent, and so forth. In some implementations, based upon a predefined criterion, the rules-based implementation may automatically and/or dynamically interpret attributes associated with each transaction. In response thereto, the rule-based implementation may automatically interpret and carry out functions associated with the transactions by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
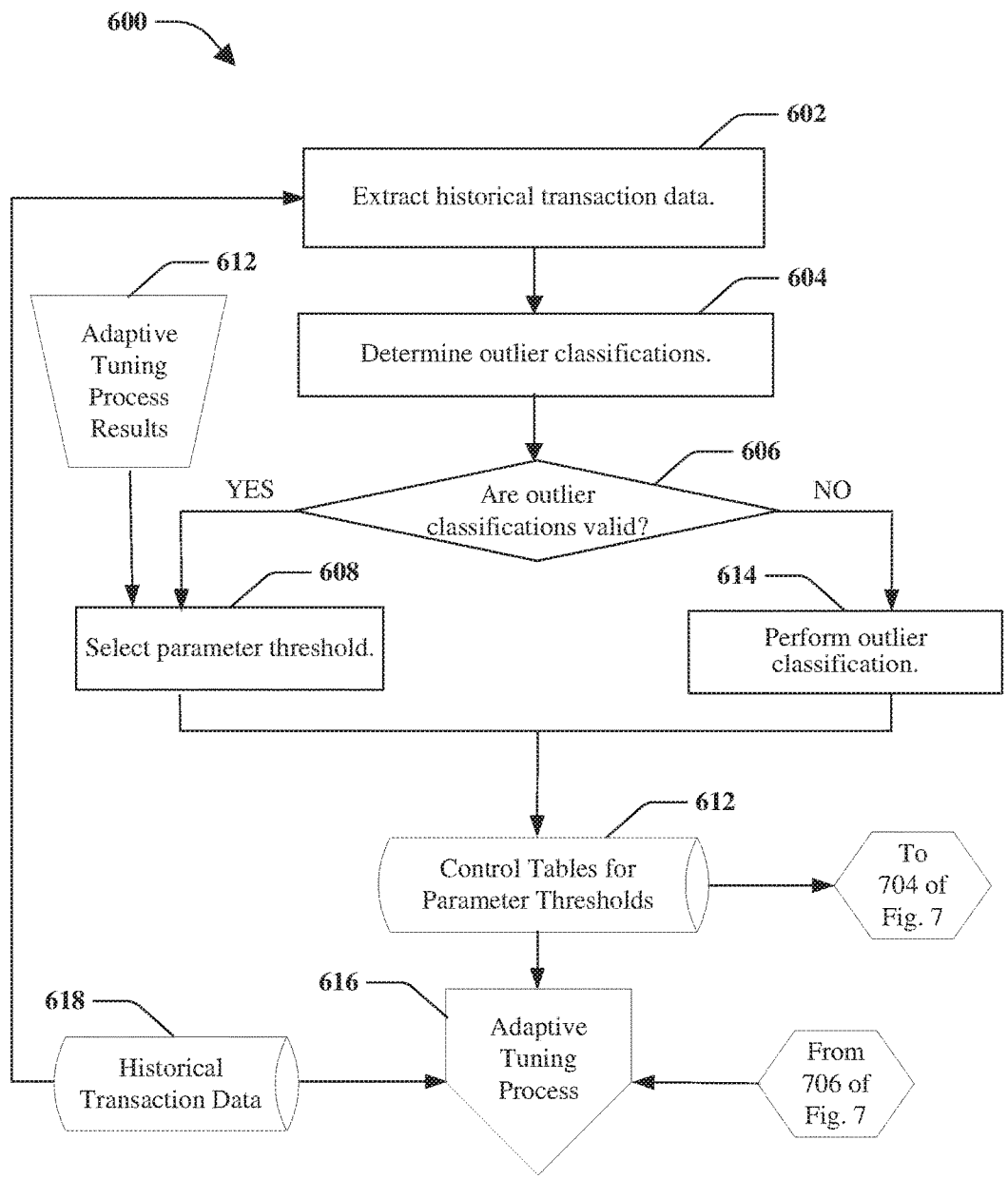
FIG. 6 illustrates an example, non-limiting method for a systematic threshold assignment process, according to an aspect.

FIG. 6 illustrates an example, non-limiting method 600 for a systematic threshold assignment process, according to an aspect. The method 600 in FIG. 6 may be implemented using, for example, any of the systems, such as the system 200 (of FIG. 2), described herein.

At 602, historical transaction data is extracted. The historical transaction data may be reviewed on a rolling basis. For example, as new data is captured and analyzed, old data is discarded. Thus, if last week's data is considered new data, the oldest week's worth of data is discarded. In another example, if data from last month is the new data, the oldest month of data is discarded.

Outlier classifications are determined, at 604. The outlier classification determination may include a Cook's D measure and/or a Kruskal-Wallis analysis. Additionally or alternatively, the outlier classification determination may include a six-sigma level analysis and/or a leaps analysis. In alternative or additional implementations, the outlier classification determination may include an optimal classification and/or may be based on rules and/or policies.

At 606, a determination is made whether the outlier classifications utilized are valid. If valid ("YES"), at 608, a parameter threshold is selected from one of the outlier classifications utilized. An input to the parameter threshold selected may be adaptive tuning process results 610. The selected parameter threshold is output to a control table for parameter thresholds, at 612.

If the outlier classification are determined to not be valid ("NO"), at 614, an outlier classification using a statistical method, such as a universal alternate method is utilized. This method may be based on the percentage increase over a top quantile, for example. The output is provided to the control tables for parameter thresholds, at 612.

Outputs of the control tables for parameter thresholds is provided to a current adaptive tuning process, at 616. Other inputs to the adaptive tuning process 616 may include historical transaction data 618 and historical case data 706 (discussed with respect to FIG. 7). The historical transaction data 618 may be updated with current data (discussed with respect to FIG. 7). The historical transaction data 618 is used as the extracted historical transaction data, at 602.

Figure 7:
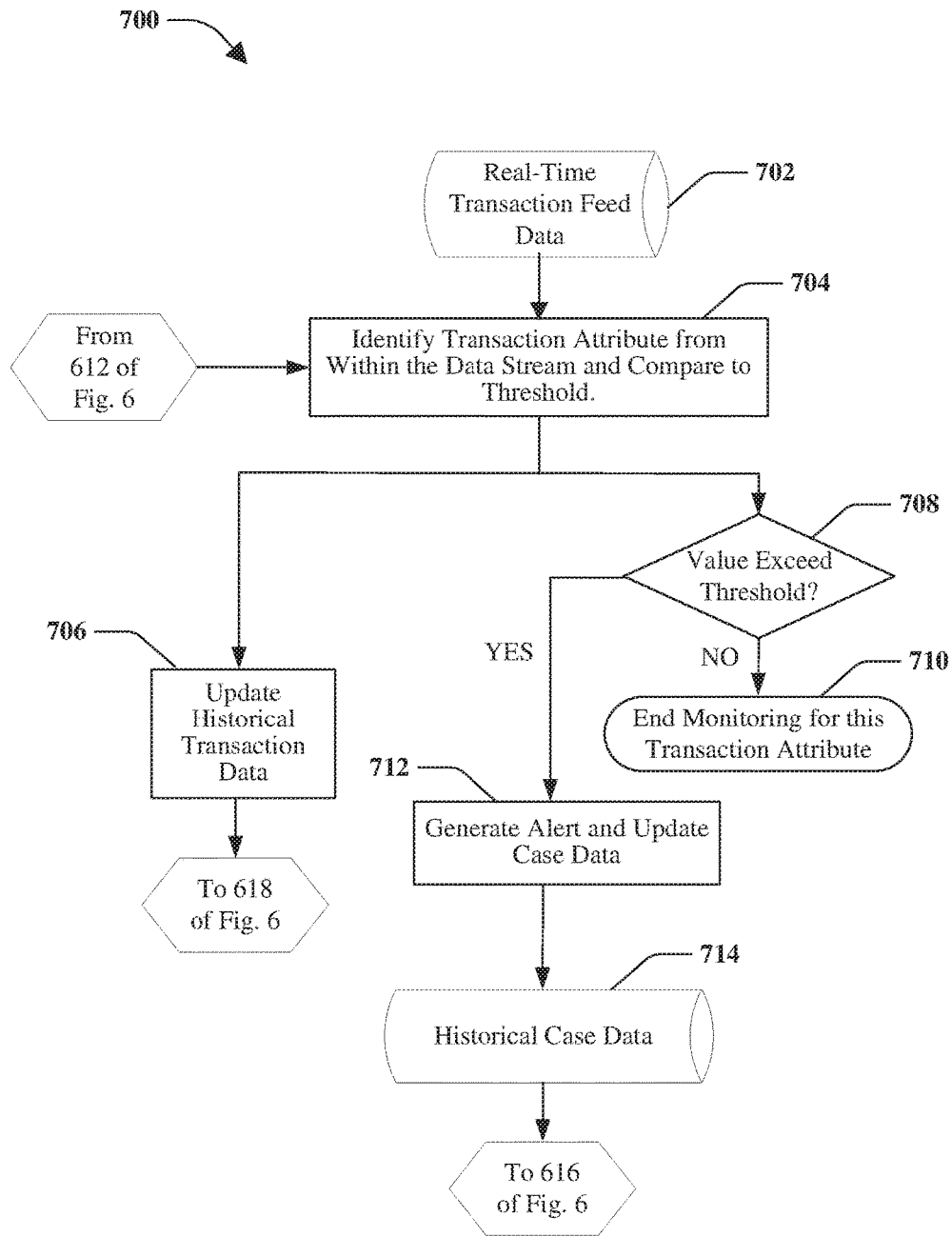
FIG. 7 illustrates an example, non-limiting method for real-time monitoring and alerting, according to an aspect.

FIG. 7 illustrates an example, non-limiting method 700 for real-time monitoring and alerting, according to an aspect. The method 700 in FIG. 7 may be implemented using, for example, any of the systems, such as the system 300 (of FIG. 3), described herein.

At 702, real-time transaction feed data is obtained. Transactions within the real-time transaction feed data are identified and compared to the threshold, at 704. An input utilized for the comparison is the control tables for parameter thresholds 612 from FIG. 6.

At substantially the same time as the transactions are identified, the historical transaction data is updated, at 706. In addition, the updated historical transaction data is included in the historical transaction data 618 of FIG. 6.

At 708, a determination is made whether the value exceeded the threshold. If the value did not exceed the threshold ("NO"), at 710, monitoring for this transaction attribute is terminated. On the other hand, if the value exceeded the threshold, at 712, an alert is generated and the case data is updated. The case data is stored as historical case data 714, and used an input to the adaptive tuning process 616 of FIG. 6.

Figure 8:
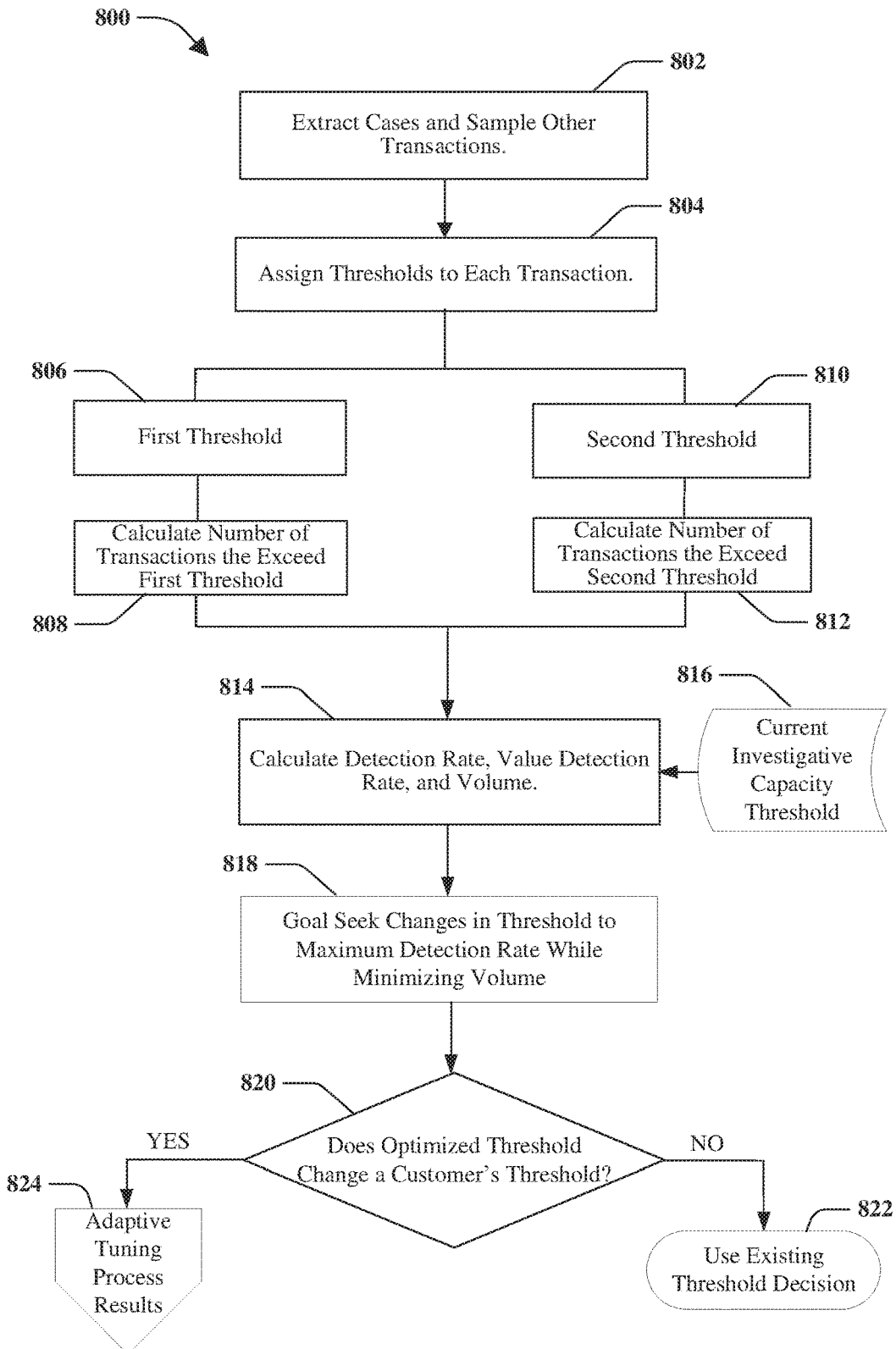
FIG. 8 illustrates an example, non-limiting method for adaptive tuning and threshold adjustment, according to an aspect.

FIG. 8 illustrates an example, non-limiting method 800 for adaptive tuning and threshold adjustment, according to an aspect. The method 800 in FIG. 8 may be implemented using, for example, any of the systems, such as the system 400 (of FIG. 4), described herein. At 802, cases are extracted and other transactions are sampled. Thresholds are assigned to each transaction, at 804.

At 806, a first threshold is assigned to the transaction. According to an implementation, the first threshold may relate to a previously assigned customer's risk threshold. Based on the first threshold, at 808, a number of transactions that exceed the first threshold is calculated. At about the same time, at 810, a second threshold may be assigned to the transaction. According to an implementation, the second threshold may be a universal risk threshold. The number of transactions that exceed the first threshold is calculated at 812.

A detection rate, value detection rate, and volume for each of the first threshold and the second threshold are calculated at 814. An input utilized for these calculations may be a current investigative capacity threshold 816. At 818, it is determined to seek changes in the threshold to maximize a detection rate while minimizing volume. Further, at 820, a determination is made whether the optimized threshold causes any change to a customer's threshold. If there is no change ("NO"), at 822, the existing threshold detection is used. If there is a change ("YES"), at 824, adaptive tuning process results are utilized.

Figure 9:
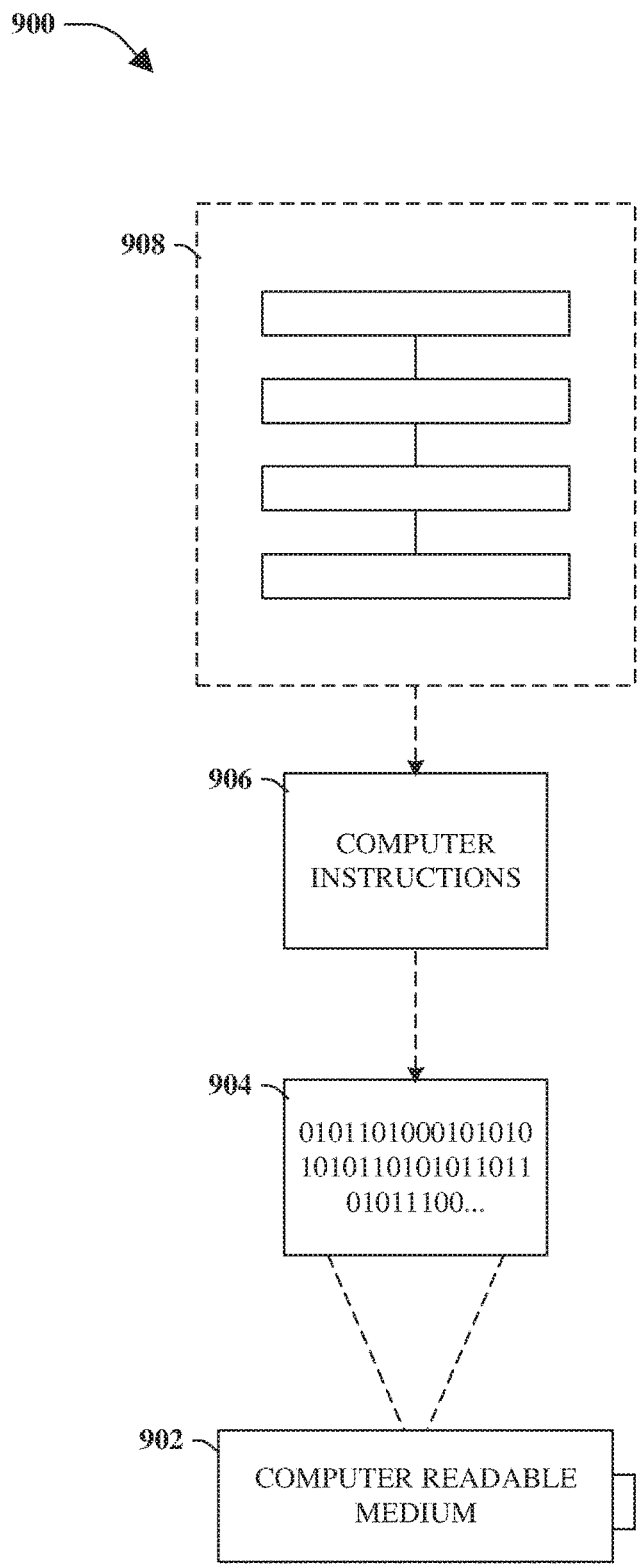
FIG. 9 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable identification of anomalous transaction attributes in real-time with adaptive threshold tuning. An embodiment of a computer-readable medium or a computer-readable device devised in these ways is illustrated in FIG. 9, wherein an implementation 900 includes a computer-readable medium 902, such as a CD-R, DVD-R, flash drive, a platter of a hard disk drive, and so forth, on which is encoded computer-readable data 904. The computer-readable data 904, such as binary data including a plurality of zero's and one's as illustrated, in turn includes a set of computer instructions 906 configured to operate according to one or more of the principles set forth herein.

In the illustrated embodiment 900, the set of computer instructions 906 (e.g., processor-executable computer instructions) may be configured to perform a method 908, such as the method 600 of FIG. 6 and/or the method 800 of FIG. 8, for example. In another embodiment, the set of computer instructions 906 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 10:
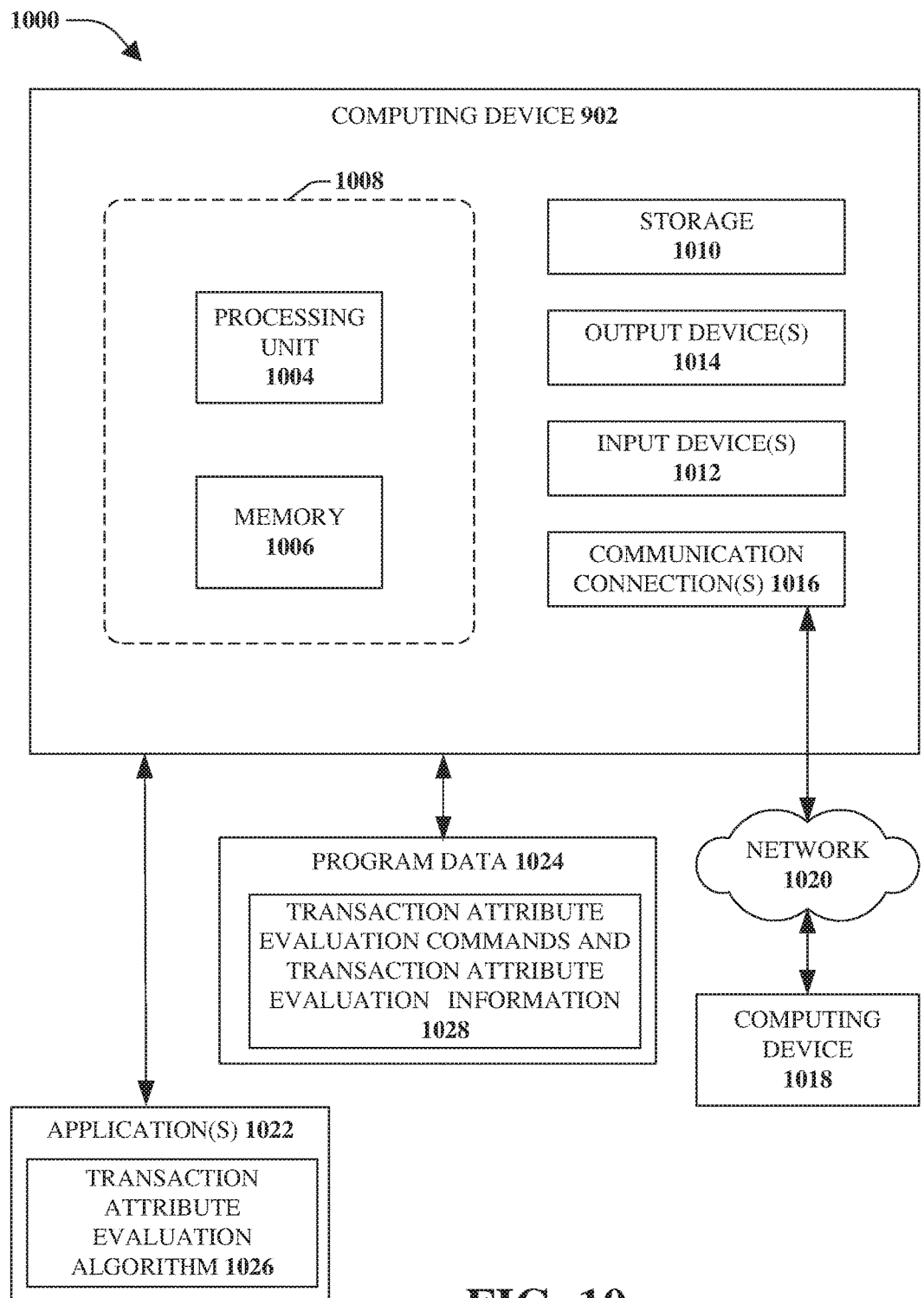
FIG. 10 illustrates an example, non-limiting computing environment where one or more of the aspects set forth herein are implemented, according to one or more aspects.

FIG. 10 illustrates a system 1000 that may include a computing device 1002 configured to implement one or more embodiments provided herein. In one configuration, the computing device 1002 may include at least one processing unit 1004 and at least one memory 1006. Depending on the exact configuration and type of computing device, the at least one memory 1006 may be volatile, such as RAM, non-volatile, such as ROM, flash memory, etc., or a combination thereof. This configuration is illustrated in FIG. 10 by dashed line 1008.

In other embodiments, the computing device 1002 may include additional features or functionality. For example, the computing device 1002 may include additional storage such as removable storage or non-removable storage, including, but not limited to, magnetic storage, optical storage, etc. Such additional storage is illustrated in FIG. 10 by storage 1010. In one or more embodiments, computer readable instructions to implement one or more embodiments provided herein are in the storage 1010. The storage 1010 may store other computer readable instructions to implement an operating system, an application program, etc. Computer readable instructions may be loaded in the at least one memory 1006 for execution by the at least one processing unit 1004, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1002 may include input device(s) 1012 such as keyboard, mouse, pen, voice input device, touch input device, infrared cameras, video input devices, or any other input device. Output device(s) 1014 such as one or more displays, speakers, printers, or any other output device may be included with the computing device 1002. The input device(s) 1012 and the output device(s) 1014 may be connected to the computing device 1002 via a wired connection, wireless connection, or any combination thereof. In one or more embodiments, an input device or an output device from another computing device may be used as the input device(s) 1012 and/or the output device(s) 1014 for the computing device 1002. Further, the computing device 1002 may include communication connection(s) 1016 to facilitate communications with one or more other devices, illustrated as a computing device 1018 coupled over a network 1020.

One or more applications 1022 and/or program data 1024 may be accessible by the computing device 1002. According to some implementations, the application(s) 1022 and/or program data 1024 are included, at least in part, in the computing device 1002. The application(s) 1022 may include a transaction attribute evaluation algorithm 1026 that is arranged to perform the functions as described herein including those described with respect to the system 400 of FIG. 4. The program data 1024 may include transaction attribute evaluation commands and transaction attribute evaluation information 1028 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a hardware processor that executes the following computer executable components stored in a memory:
a simulation manager that systematically models one or more attributes of transactions of a consumer included in a set of historical transactions of the consumer,
wherein the one or more attributes include at least a customer infrastructure characteristic and an insufficient transaction activity evaluation;
a limitation manager that determines a consumer ceiling threshold for one or more transaction level characteristics associated with the modeling, the one or more transaction level characteristics represent respective values beyond which a subsequent transaction of the consumer is considered anomalous for that characteristic;
a detection manager that provides real-time, or substantially real-time, detection of anomalous transactions and non-anomalous transactions, wherein respective alerts are output based on detection of the anomalous transactions; and
an adaptive tuning processor that provides systematic processing one of an allowance or a rejection of the anomalous and non-anomalous transactions based at least in part on the respective alerts,
wherein the systematic processing integrates the consumer ceiling threshold via the modeling to base the one of allowance or rejection on at least the modeled transaction attributes and the subsequent transaction by individually tuning a plurality of segments of the modeled transaction attributes on an ongoing basis; and
wherein the components execute to mitigate fraud in a computing environment.

2. The system of claim 1, further comprising a segmentation component that separates the transactions included in the set of historical transactions into a first category and a second category.

3. The system of claim 2, wherein the first category includes domestic transactions and the second category includes international transactions.

4. The system of claim 2, further comprising an evaluation component that performs a statistical evaluation on the transactions included in the first category independent from another statistical evaluation on other transactions included in the second category.

5. The system of claim 1, further comprising a first evaluator that performs a Cook's D measure to remove from the simulation manager modeling a first set of transactions of the set of historical transactions by using a standardized residual distance of the one or more transaction level characteristics from a historically observed trend for the one or more attributes.

6. The system of claim 5, further comprising a second evaluator that calculates a probability distribution enabling a placement of newly observed transaction characteristics within the probability distribution.

7. The system of claim 6, wherein the second evaluator utilizes a non-parametric Kruskal-Wallis one-way analysis of variance.

8. The system of claim 6, further comprising a third evaluator that determines a number of standard deviations from a mean of the set of historical transactions.

9. The system of claim 8, further comprising a fourth evaluator that determines a business rule in terms of absolute dollar amount leaps from one transaction to a second transaction, or across multiple transactions.

10. The system of claim 1, further comprising a tolerance component that refines a threshold and identifies a new threshold that represents a material increase over a raw threshold.

11. The system of claim 10, wherein the tolerance component scales the new threshold as a function of a risk tolerance level.

12. The system of claim 1, wherein each attribute of the one or more attributes carries a measure of standard practices or patterns associated with an identity of a customer.

13. A method, by a system comprising a hardware processor, configured to perform an ordered combination of actions, comprising:
 evaluating, by the system, a set of consumer transactions conducted during a defined time period, wherein the set includes one or more attributes that include at least a customer infrastructure characteristic and an insufficient transaction activity evaluation;
 categorizing, by the system, transactions within the set of consumer transactions into defined groups;
 removing, by the system, outlier transactions from the set of consumer transactions;
 identifying, by the system, a set of non-anomalous transactions;
 receiving, by the system, a subsequent consumer transaction; and
 performing, by an adaptive tuning processor of the system, the following:
  automatically allowing the subsequent transaction based on a determination that the subsequent transaction conforms to the set of non-anomalous transactions; or
  automatically rejecting the subsequent transaction and outputting an alert for further analysis of the subsequent transaction based on another determination that the subsequent transaction does not conform to the set of non-anomalous transactions,
   wherein the automatically allowing or automatically rejecting integrates a consumer ceiling threshold via a modeling based on at least a modeled transaction attribute and the subsequent transaction by individually tuning a plurality of segments of the modeled transaction attributes on an ongoing basis; and
 wherein the ordered combination of actions mitigate computing fraud.

14. The method of claim 13, wherein categorizing transactions comprises categorizing the transactions into a first group having a first transaction destination and a second group having a second destination.

15. The method of claim 14, wherein the removing outlier transactions comprises removing a first set of outlier transactions from the first group and a second set of outlier transactions from the second group.

16. The method of claim 15, wherein the identifying non-anomalous transactions comprises identifying a first set of non-anomalous transactions in the first group and a second set of non-anomalous transactions in the second group.

17. The method of claim 16, wherein the removing outlier transactions comprises performing a Cook's D measure, a non-parametric Kruskal-Wallis one-way analysis of variance, a number of standard deviations from a mean of the set of transactions, a business rule, or combinations thereof.

18. A computer-readable storage device that stores executable instructions that, in response to execution, cause a system comprising a hardware processor to configure the hardware processor to perform operations, comprising:
 systematically modeling one or more attributes of transactions of a consumer included in a set of historical transactions of the consumer, wherein the one or more attributes include at least a customer infrastructure characteristic and an insufficient transaction activity evaluation;
 determining a consumer ceiling threshold for one or more transaction level characteristics associated with the modeling, the one or more transaction level characteristics represent respective values beyond which a subsequent transaction of the consumer is considered anomalous for that characteristic;
 providing real-time, or substantially real-time, detection of anomalous transactions and non-anomalous transactions, wherein respective alerts are output based on detection of the anomalous transactions; and
 providing systematic processing one of an allowance or a rejection of the anomalous and non-anomalous transactions based at least in part on the respective alerts,
  wherein the systematic processing integrates the consumer ceiling threshold via the modeling to base the one of allowance or rejection on at least the modeled transaction attributes and the subsequent transaction by individually tuning a plurality of segments of the modeled transaction attributes on an ongoing basis; and
 wherein the components execute to mitigate computing fraud in a computing environment.

19. The computer-readable storage device of claim 18, wherein the operations further comprise:
 dividing the transactions included in the set of historical transactions into a first category and a second category, wherein the first category includes domestic transactions and the second category includes international transactions; and
 performing a statistical evaluation on the transactions included in the first category independent from another statistical evaluation on other transactions included in the second category.

20. The computer-readable storage device of claim 18, wherein the operations further comprise:
 performing at least one of a Cook's D measure, a non-parametric Kruskal-Wallis one-way analysis of variance, a number of standard deviations from a mean of the set of historical transactions, a business rule in terms of absolute dollar amount leaps from one transaction to a second transaction, or across multiple transactions.

\* \* \* \* \*